(12) United States Patent
Bejin et al.

(10) Patent No.: US 11,162,523 B2
(45) Date of Patent: Nov. 2, 2021

(54) PUSH PIN WITH ANTIROTATIONAL STOPPER AND METHOD OF USE THEREOF

(71) Applicants: William Bejin, Grosse Pointe Woods, MI (US); Thomas Dale Owen, Braselton, GA (US)

(72) Inventors: William Bejin, Grosse Pointe Woods, MI (US); Thomas Dale Owen, Braselton, GA (US)

( * ) Notice: Subject to any disclaimer, the term of this patent is extended or adjusted under 35 U.S.C. 154(b) by 36 days.

(21) Appl. No.: 16/700,896

(22) Filed: Dec. 2, 2019

(65) Prior Publication Data

US 2020/0102979 A1 Apr. 2, 2020

Related U.S. Application Data

(63) Continuation of application No. 15/891,321, filed on Feb. 7, 2018, now Pat. No. 10,495,126.

(60) Provisional application No. 62/455,702, filed on Feb. 7, 2017.

(51) Int. Cl.
| | |
|---|---|
| *F16B 21/16* | (2006.01) |
| *F16B 35/00* | (2006.01) |
| *F16B 35/04* | (2006.01) |
| *F16L 3/23* | (2006.01) |
| *F16L 3/13* | (2006.01) |
| *H01R 4/48* | (2006.01) |
| *H01R 13/73* | (2006.01) |
| *F16L 3/233* | (2006.01) |
| *F16L 3/137* | (2006.01) |
| *F16B 33/00* | (2006.01) |

(52) U.S. Cl.
CPC .............. *F16B 21/16* (2013.01); *F16L 3/137* (2013.01); *F16L 3/233* (2013.01); *F16B 33/002* (2013.01); *F16B 35/048* (2013.01); *H01R 4/48* (2013.01); *H01R 13/73* (2013.01); *Y10T 29/49948* (2015.01)

(58) Field of Classification Search
CPC ...... F16B 21/16; F16B 35/048; F16B 33/002; F16L 3/233; F16L 3/137; H01R 13/73; H01R 4/48; Y10T 29/49948
See application file for complete search history.

(56) References Cited

U.S. PATENT DOCUMENTS

| | | | | |
|---|---|---|---|---|
| 3,653,096 A | * | 4/1972 | Fernberg ................ | F16L 3/2332 24/16 PB |
| 4,866,816 A | * | 9/1989 | Caveney ................. | F16L 3/233 24/16 PB |
| 5,131,613 A | * | 7/1992 | Kamiya .................. | F16L 3/233 24/16 PB |
| 5,301,396 A | * | 4/1994 | Benoit .................. | F16B 21/086 24/297 |

(Continued)

*Primary Examiner* — Bayan Salone
(74) *Attorney, Agent, or Firm* — Mathew L. Grell; Jeffrey C. Watson; Grell & Watson Patent Attorneys LLC (57) ABSTRACT

A push pin with rotational stopper and method of use thereof includes a push pin configured with a plurality of retention barbs extending outward from a surface of the insertion member, the insertion member configured with an anti-rotation section to friction fit therewith a sidewall of an aperture in the panel, an disc spring positioned proximate said anti-rotation section and configured to provide an opposing force to said retention barbs to limit insertion and removal therein the aperture in the panel.

20 Claims, 10 Drawing Sheets

(56) References Cited

U.S. PATENT DOCUMENTS

| | | | | |
|---|---|---|---|---|
| 5,337,983 A * | 8/1994 | Mailey | F16L 3/137 | 248/68.1 |
| 5,385,321 A * | 1/1995 | Kume | F16B 2/08 | 24/16 PB |
| 5,921,510 A * | 7/1999 | Benoit | F16L 3/2334 | 248/71 |
| 7,753,321 B2 * | 7/2010 | Geiger | H02G 3/30 | 248/74.3 |
| 7,762,503 B2 * | 7/2010 | Franks | H02G 3/32 | 248/71 |
| 7,793,895 B2 * | 9/2010 | Franks | F16B 19/00 | 248/74.3 |
| 8,028,962 B2 * | 10/2011 | Geiger | F16L 3/13 | 248/74.3 |
| 8,221,042 B2 * | 7/2012 | Vitali | F16B 21/086 | 411/510 |
| 8,579,239 B2 * | 11/2013 | Lothamer | B60R 16/0215 | 248/69 |
| 8,899,532 B2 * | 12/2014 | Tanaka | F16B 21/086 | 248/74.3 |
| D741,691 S * | 10/2015 | Adams | D8/356 | |
| 9,210,969 B2 * | 12/2015 | Wheelwright | A44B 11/2592 | |
| 9,212,677 B2 * | 12/2015 | Owen | B65D 63/1027 | |
| 9,511,544 B2 * | 12/2016 | Hemingway | B29C 64/124 | |
| 10,495,126 B2 * | 12/2019 | Bejin | F16L 3/137 | |
| D909,183 S * | 2/2021 | Chen | D8/354 | |
| 2002/0084388 A1 * | 7/2002 | Geiger | F16L 3/233 | 248/74.3 |
| 2005/0242247 A1 * | 11/2005 | Geiger | F16L 3/2332 | 248/74.3 |
| 2008/0035801 A1 * | 2/2008 | Adams | F16B 5/0685 | 248/73 |
| 2010/0223765 A1 * | 9/2010 | Vitali | F16B 21/086 | 24/297 |
| 2013/0312227 A1 * | 11/2013 | Wheelwright | A44B 11/2592 | 24/16 PB |
| 2014/0017036 A1 * | 1/2014 | Everard | F16B 21/02 | 411/500 |
| 2014/0086704 A1 * | 3/2014 | Hemingway | B29C 64/147 | 411/392 |
| 2015/0219136 A1 * | 8/2015 | Koelling | F16B 19/002 | 411/510 |

* cited by examiner

FIG. 7

PUSH PIN WITH ANTIROTATIONAL STOPPER AND METHOD OF USE THEREOF

CROSS-REFERENCE TO RELATED APPLICATIONS

To the full extent permitted by law, the present United States Non-provisional patent application is a continuation of and claims priority to and the full benefit of U.S. patent application Ser. No. 15/891,321 filed on Feb. 7, 2018, entitled "PUSH PIN WITH ANTIROTATIONAL STOPPER AND METHOD OF USE THEREOF," which claims priority benefit of U.S. Provisional Application No. 62/455,702, filed on Feb. 7, 2017, entitled "Hole Anchor and Method of Use to Prevent Rotation," which are incorporated herein by reference in their entirety.

TECHNICAL FIELD

The disclosure generally relates to fastening devices, more specifically, it is related to a push mount fastening device with an anti-rotational component.

BACKGROUND

A variety of fastening devices are available, such as pins or rivets, push pins or rivets, push pins or rivets configured with retention barbs, known as fir tree or xmas tree pins or rivets, are well known in the art and are used in a variety of applications, such as securing one or more items to a third item having a hole or aperture therethrough. Known push pins or rivets configured with retention barbs, known as fir tree or xmas tree pins or rivets of conventional construction have an umbrella head and an elongate member configured with the plurality of retention barbs therearound. In use, the elongate member of the fir tree or xmas tree push pin or rivet is inserted through at least one hole or aperture in an article until the umbrella head is seated against or in contact with the article. The retention barbs prevent the fir tree or xmas tree push pin or rivet from releasing or exiting the at least one hole or aperture in an article and the umbrella head prevents the fir tree or xmas tree push pin or rivet from further entry therein the at least one hole or aperture in an article.

Some specific uses of the fir tree or xmas tree push pin or rivet are in the field of automotive or appliances assembly, wherein one approach the fir tree or xmas tree push pins or rivets are utilized to secure one or more holed panels to a stationary or anchor hole or aperture positioned in a frame or panel of automotive or appliances assembly. In another approach, the fir tree or xmas tree push pins or rivets are utilized to secure integral second fastening devices such as ties, connectors, clips, fasteners, latches, and the like. Such ties, connectors, clips, fasteners, latches are used to secure wire bundles, panels, hose(s), conduit(s), part(s), and other components or subsystems within the vehicle, appliance, seats, instrument panels, engine compartment, chases, frame or subsection thereof to the fir tree or xmas tree push pins or rivet, which are affixed to the stationary or anchor hole or aperture positioned in a frame or panel of automotive or appliances assembly.

One disadvantage of this approach is that the prior fir tree or xmas tree push pins or rivets are deficient in that they allow the fastening device, such as the fir tree or xmas tree push pins or rivets to move, vibrate, rotate, or twist in the anchor hole or aperture positioned in a frame or panel of automotive or appliances assembly. Movement, rotation, or twisting of the fir tree or xmas tree push pin or rivet in the anchor hole or aperture may result in misalignment of the content secured in the integral second fastening devices such as ties, malfunction or open circuit of electrical connectors, clips, fasteners, latches, and the like held by fir tree or xmas tree push pins or rivets. Another disadvantage is that overtime the rotation, or twisting of the fir tree or xmas tree push pin or rivet in the anchor hole or aperture may result in breakdown of the plurality of retention barbs positioned along the elongated member causing the xmas tree push pin or rivet to loosen and/or release its grip on the stationary or anchor hole or aperture.

Therefore, it is readily apparent that there is a recognizable unmet need for a push pin or rivet with anti-rotational stopper and method of use thereof that functions to prevent the rotation, or twisting of the fir tree or xmas tree push pin or rivet in the anchor hole or aperture which may result in misalignment of the content secured in the integral second fastening devices such as ties, connectors, clips, fasteners, latches, and the like, malfunction or open circuit of electrical connector, or breakdown of the plurality of retention barbs positioned along the elongated member and cause the xmas tree push pin or rivet to loosen and/or release its grip on the stationary or anchor hole or aperture.

SUMMARY

Briefly described, in an example embodiment, the present apparatus and method overcomes the above-mentioned disadvantages and meets the recognized need for a push pin with rotational stopper and method of use thereof including, in general, a push pin or rivet configured having a head positioned on a first end of an elongate member configured with a plurality of retention barbs extending outward therefrom, the head further includes an umbrella stopper and an ant-rotational device and, thus, functions to prevent the rotation, or twisting of the fir tree or xmas tree push pin or rivet in the stationary or anchor hole or aperture which may result in misalignment of the content secured in the integral second fastening devices such as ties, connectors, clips, fasteners, latches, and the like, malfunction or open circuit of electrical connector, breakdown of the plurality of retention barbs positioned along the elongated member and cause the xmas tree push pin or rivet to loosen and/or release its grip on the stationary or anchor hole or aperture.

According to its major aspects and broadly stated, the present apparatus meets the recognized need for a push pin with rotational stopper and method of use thereof includes a push pin configured with a plurality of retention barbs extending outward from a surface of the insertion member, the insertion member configured with an anti-rotation section to friction fit therewith a sidewall of an aperture in the panel, an disc spring positioned proximate said anti-rotation section and configured to provide an opposing force to oppose said retention barbs to limit insertion and removal therein the aperture in the panel.

In an exemplary embodiment, a push pin for insertion into an aperture in a panel, the push pin includes an elongated member, the elongated member having a first member end and a second member end configured with one or more retention barbs extending outward from the elongated member and positioned therebetween the first member end and the second member end, a three or more sided anti-rotation section positioned proximate and integral thereto the first member end, and a disc spring positioned proximate and integral thereto the three or more sided anti-rotation section opposite the elongated member.

In a further exemplary embodiment, a method of fastening a push pin to an aperture in a panel to hold an electrical component thereto, the fastening includes the steps of providing a push pin having an elongated member, the elongated member having a first member end and a second member end configured with one or more retention barbs extending outward from the elongated member and positioned therebetween the first member end and the second member end, a three or more sided anti-rotation section positioned proximate and integral thereto the first member end, a disc spring positioned proximate and integral thereto the three or more sided anti-rotation section opposite the elongated member, inserting the elongated member therein the aperture of the panel, twisting the push pin to align the three or more sided anti-rotation section with the aperture of the panel, and inserting the three or more sided anti-rotation section therein the aperture of the panel until the disc spring contacts the panel.

Accordingly, a feature of the push pin with rotational stopper and method of use thereof is its ability to provide a head of the push pin or rivet configured having an integral fastening devices such as ties, connectors, clips, fasteners, latches and the like to secure content such as, to secure wire bundles, panels, hose(s), conduit(s), part(s), and other components or subsystems within an article, such as a vehicle, appliance, seats, instrument panels, engine compartment, chases, frame or subsection thereof.

Another feature of the push pin with rotational stopper and method of use thereof is its ability to provide a head of the push pin or rivet configured having an integral fastening device such as an USCAR clip slot.

Yet another feature of the push pin with rotational stopper and method of use thereof is its ability to provide a variety of configurations of the anti-rotation section to friction fit therewith a sidewall of a variety of aperture configurations in the panel.

Yet another feature of the push pin with rotational stopper and method of use thereof is its ability to provide an anti-rotation or anti-twisting mount for an electrical connector that does not rotate, twist, add additional vibration which may lead to a malfunction or open circuit of the electrical connector.

Yet another feature of the push pin with rotational stopper and method of use thereof is its ability to provide a head of the push pin or rivet configured having an integral fastening device such as a cable tie configured with one or more parallel rows of a plurality of teeth or cross-bars formed crosswise on the elongated strap.

Yet another feature of the push pin with rotational stopper and method of use thereof is its ability to provide a head of the push pin or rivet configured having an integral fastening device such as a cable tie configured with two rows of teeth leaving the center section of the flexible longitudinal strap open to position the plurality of mounting mechanisms, such as holes.

Yet another feature of the push pin with rotational stopper and method of use thereof is its ability to provide a head of the push pin or rivet configured having an integral fastening device such as a cable tie configured with a locking buckle having one or more channels and each channel having a locking tang or pawl positioned within the channel to accommodate the one or more rows of teeth of the flexible longitudinal strap, and thus providing finite adjustment and extra bundling power.

Yet another feature of the push pin with rotational stopper and method of use thereof is its ability to provide an anti-rotation section to friction fit therewith a sidewall of an aperture in the panel to prevent the rotation, or twisting of the fir tree or xmas tree push pin or rivet in the stationary or anchor hole or aperture which may result in misalignment of the content secured in the integral fastening devices such as ties, connectors, clips, fasteners, latches, and the like.

Yet another feature of the push pin with rotational stopper and method of use thereof is its ability to provide an anti-rotation section to friction fit therewith a sidewall of an aperture in the panel to prevent the breakdown of the plurality of retention barbs positioned along the elongated member and cause the xmas tree push pin or rivet to loosen and/or release its grip on the stationary or anchor hole or aperture.

Yet another feature of the push pin with rotational stopper and method of use thereof is its ability to provide an anti-rotation section supported by more than two surfaces to friction fit therewith more than two sidewall of an aperture in the panel resulting in a smaller or reduced size anti-rotation section and aperture in the panel while maintaining the ability to withstand greater rotational forces before failure. The multi-surface configuration also allows for multiple orientations within the same opening in a panel.

Yet another feature of the push pin with rotational stopper and method of use thereof is its ability to provide a means for anchoring an electrical connector, component, or the like to a hole or aperture in a panel and a means for preventing rotation.

These and other features of the push pin with rotational stopper and method of use thereof will become more apparent to one skilled in the art from the following Brief Description of the Drawings, Detailed Description, and Claims when read in light of the accompanying Detailed Drawings.

BRIEF DESCRIPTION OF THE DRAWINGS

The present push pin with rotational stopper and method of use thereof or the like will be better understood by reading the Detailed Description of the embodiments with reference to the accompanying drawings, in which like reference to numerals denote similar structures and refer to like elements throughout, and in which:

FIG. 2E1 is a top view of a cross-sectional of an alternate exemplary rotational stopper;

FIG. 2E2 is a top view of a cross-sectional of an alternate exemplary rotational stopper;

It is to be noted that the drawings presented are intended solely for the purpose of illustration and that they are, therefore, neither desired nor intended to limit the disclosure to any or all of the exact details of construction shown, except insofar as they may be deemed essential to the claimed invention.

DETAILED DESCRIPTION

In describing the exemplary embodiments of the present disclosure, as illustrated in FIGS. 1A, 1B, 1C, 2A, 2B, 2C, 2D, 2E1, 2E2, 3A, 3B, 3C, 3D, 4A, 4B, 4C, 4D, 4E, 5A, 5B, 5C, 6A, 6B, and 7, with specific terminology is employed for the sake of clarity. The present disclosure, however, is not intended to be limited to the specific terminology so selected, and it is to be understood that each specific element includes all technical equivalents that operate in a similar manner to accomplish similar functions. Embodiments of the claims may, however, be embodied in many different forms and should not be construed to be limited to the embodiments set forth herein. The examples set forth herein are non-limiting examples, and are merely examples among other possible examples.

Figure 1A:
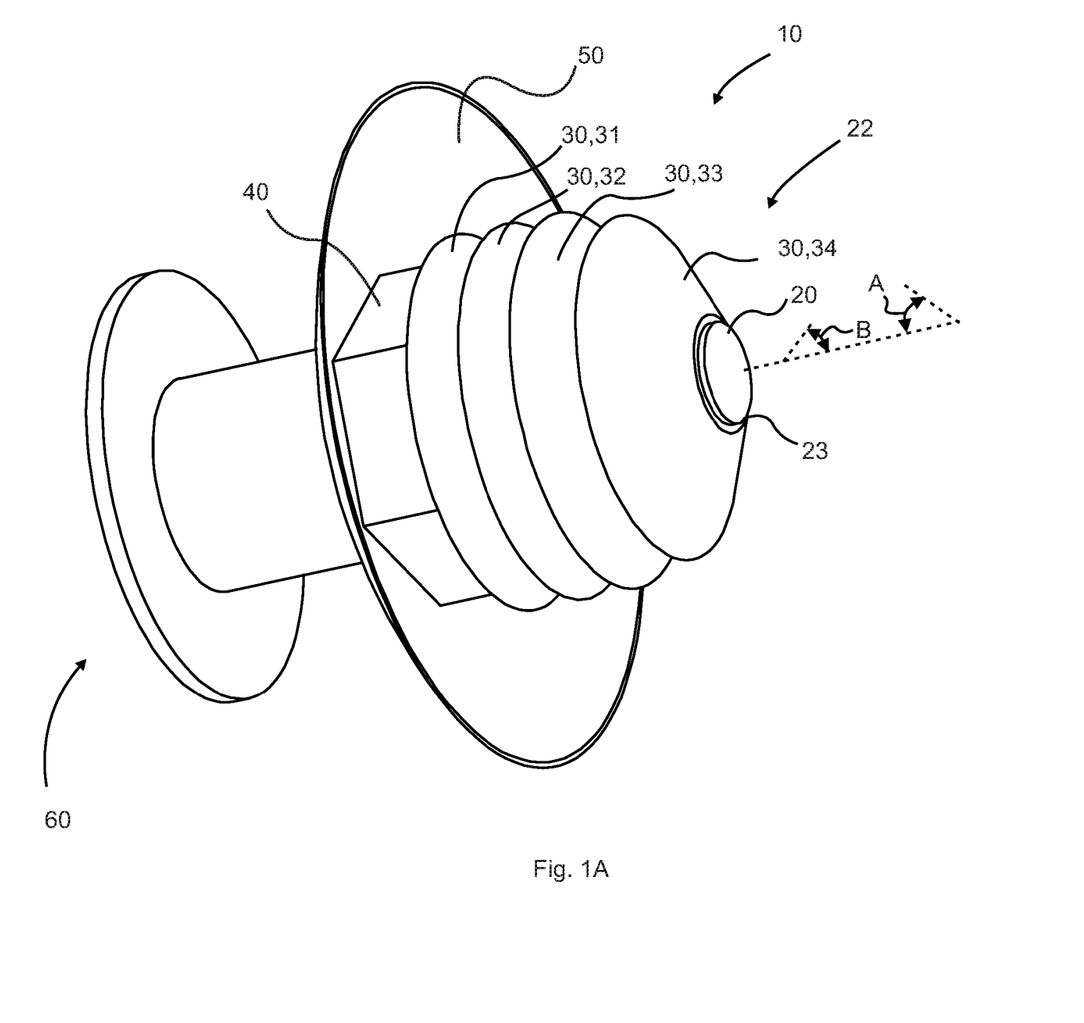
FIG. 1A is a bottom perspective view of the exemplary push pin with rotational stopper.
Figure 1B:
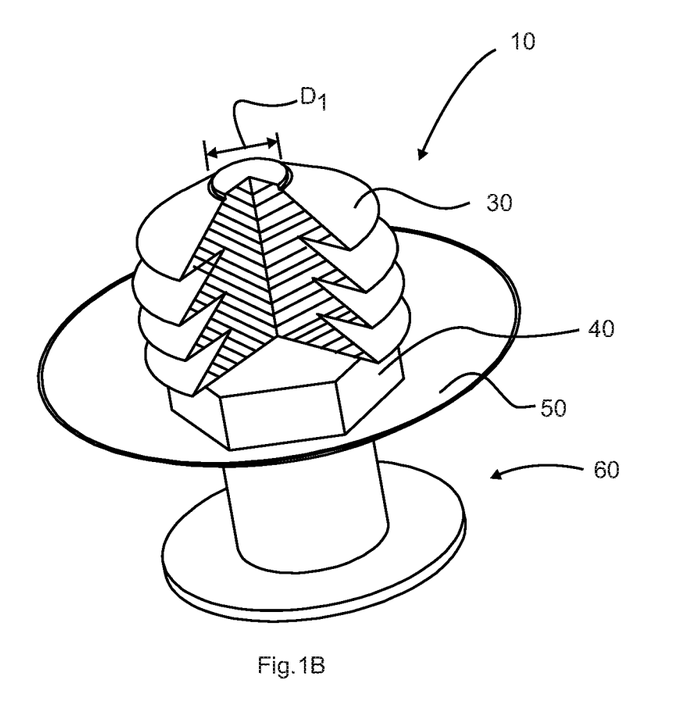
FIG. 1B is a partial cross-sectional view of the exemplary push pin with rotational stopper.
Figure 1C:
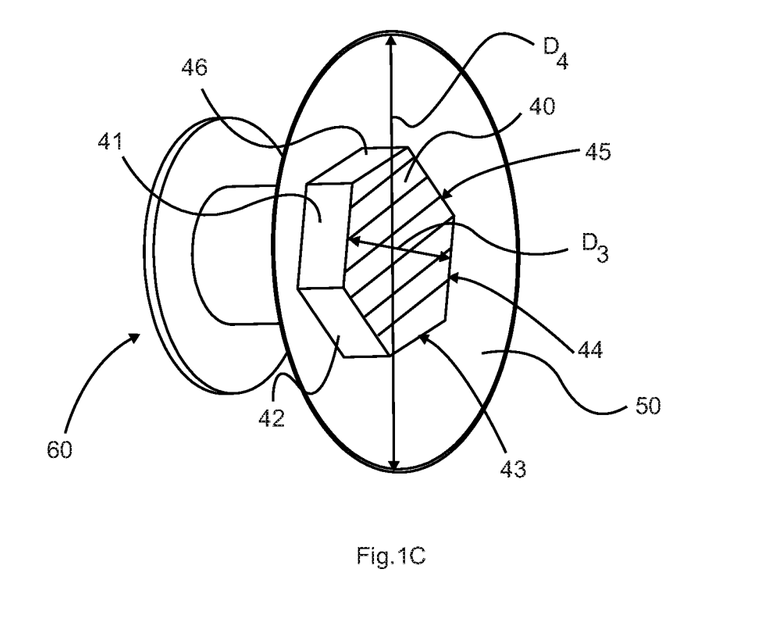
FIG. 1C bottom perspective view of the exemplary push pin with rotational stopper, with elongated member removed.

Referring now to FIGS. 1A, 1B, and 1C by way of example, and not limitation, there is illustrated an example embodiment push pin, rivet, fir tree or xmas tree pin or rivet, such as push pin with rotational stopper 10. Preferably, push pin with rotational stopper includes an round or circular insertion member, such as elongated member 20 having round surface 23 extending from a first member end 21 to a second member end 22. Moreover, elongated member 20 may be configured with a plurality of, one or more, or arrays of flexible flaps, fins, springs, skirts such as retention barbs 30 extending outward along a peripheral therefrom surface 23. Elongated member 20 may include one or more arrays, such as, first array or section of retention barbs 30 extending outward from surface 23 and towards first member end 21.

In this exemplary embodiment, retention barbs 30 include first retention barbs 31, second retention barbs 32, third retention barbs 33, and fourth retention barbs 34 positioned therebetween first member end 21 and a second member end 22 of elongated member 20. Moreover, retention barbs 30 may be configured or positioned on an angle A relative to elongated member 20 and such angle is preferably angled towards first member end 21.

Push pin with rotational stopper 10 may further include a section or feature having three or more sides or surfaces, such as three or more sided anti-rotation section 40. Three or more sided anti-rotation section 40 may be configured to provide anti-rotation or anti-twisting mount for push pin with rotational stopper 10, to prevent rotation, twisting, add additional vibration between push pin with rotational stopper 10 and a panel. Preferably three or more sided anti-rotation section 40 may be positioned proximate and integral thereto first member end 21 of elongated member 20 and extending therefrom. As shown in FIGS. 1A, 1B, and 1C, three or more sided anti-rotation section 40 may include first anti-rotation side 41, second anti-rotation side 42, third anti-rotation side 43, fourth anti-rotation side 44, fifth anti-rotation side 45, and sixth anti-rotation side 46. It is contemplated herein that three or more sided anti-rotation section 40 may include a variety of cross-sectional configurations, such as pentagon, hexagon, heptagon, octagon, nonagon, decagon, and other numbered sides, star, cross, square, rectangle, rhombus, trapezoid, parallelogram, and other three or more sided configurations.

Next, push pin with rotational stopper 10 may further include a disc, flap, umbrella section, spring, or skirt, such as disc spring 50 positioned proximate and integral thereto three or more sided anti-rotation section 40. Moreover, disc spring 50 may be configured or positioned on an angle B relative to elongated member 20 and such angle is preferably angled towards second member end 22. It is contemplated herein that opposing angled disc spring 50 with angle B relative to elongated member 20 and retention barbs 30 with angle A (acute angle) relative to elongated member 20 from second member end 22 to first member end 21 and may be utilized to provide reverse grips or opposing forces to hold push pin with rotational stopper 10 in a hole or aperture, or disc spring 50 with angle B (obtuse angle) relative to elongated member 20 from second member end 22 to first member end 21 and may provide a reverse grip or opposing force to retention barbs 30 with angle A relative to elongated member 20 to limit insertion and removal therein a hole or aperture.

Disc spring 50 may be configured having an area or diameter D4 wider or greater than area or diameter D3 of three or more sided anti-rotation section 40, and three or more sided anti-rotation section 40 may be configured having an area or diameter D3 wider or greater than area or diameter D1 of elongated member 20.

Furthermore, push pin with rotational stopper 10 may further include a top, such as head 60 positioned proximate and integral thereto disc spring 50. Moreover, head 60 may be configured with one or more head sides 60.1 configured to enable a user to pinch or grip one or more head sides 60.1 to aid in insertion therein and retraction thereof push pin with rotational stopper 10 in a hole or aperture. It is contemplated herein that head 60 may be configured flush with disc spring 50.

Referring now to FIGS. 2A, 2B, 2C, 2D, and 2E by way of example, and not limitation, there is illustrated an example embodiment push pin with rotational stopper 10 inserted therein, affixed, releasably affixed thereto panel hole or aperture H/A of planar material, frame or panel P. In use, elongated member 20 of push pin with rotational stopper 10 may be inserted into hole or aperture H/A of planar material, frame or panel P whereby each retention barbs 30 may be inserted therethrough hole or aperture H/A, such as ratchedly first retention barbs 31, then second retention barbs 32, then third retention barbs 33, and then fourth retention barbs 34 one after the other and provide a retention or counter removal force FR to hold push pin with rotational stopper 10 therein hole or aperture H/A of panel P. Moreover, disc spring 50 preferably limits or stops elongated member 20 of push pin with rotational stopper 10 travel or depth of insertion therein hole or aperture H/A of panel P until compressed and provides an opposing limit insertion or counter insertion force FI to prevent further insertion of push pin with rotational stopper 10 therein hole or aperture H/A of panel P. It is recognized herein that disc spring 50 may be sized or configured to fit over or cover hole or aperture H/A of panel P.

Figure 2A:
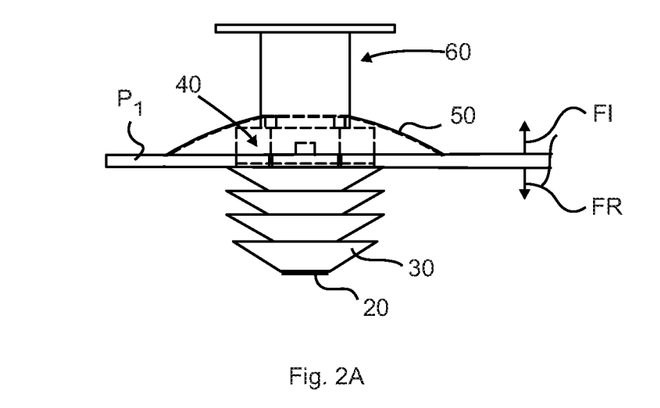
FIG. 2A is a side view of the exemplary push pin with rotational stopper, show affixed to a panel.
Figure 2B:
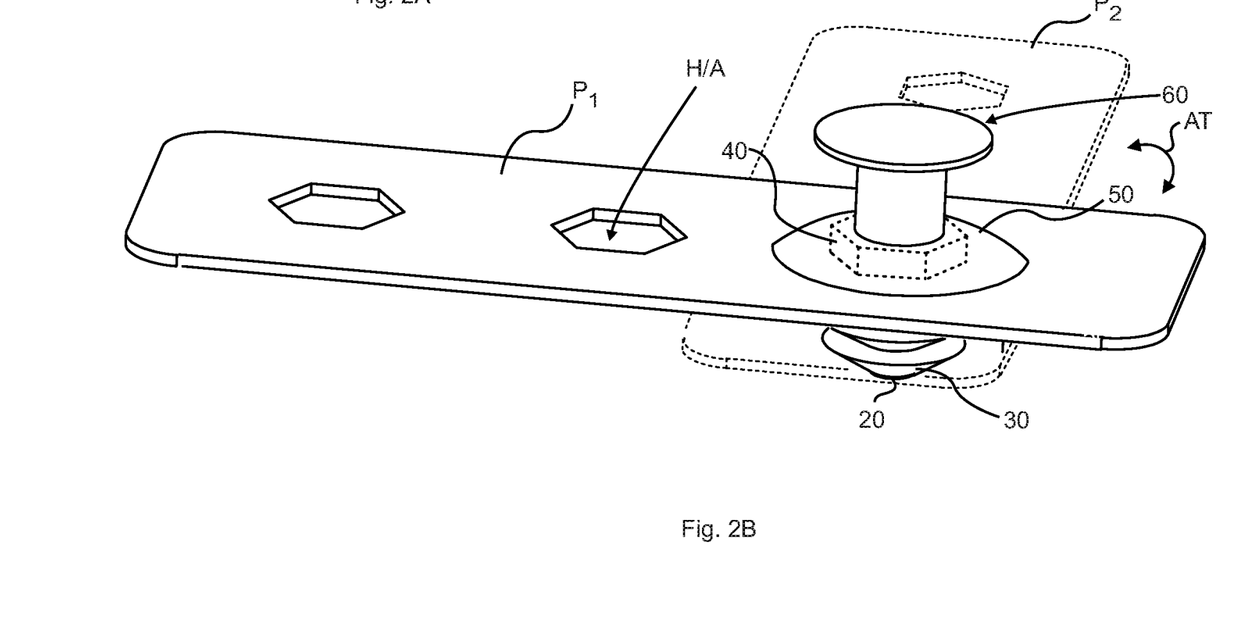
FIG. 2B is a perspective view of the exemplary push pin with rotational stopper, show affixed thereto two panels.
Figure 2C:
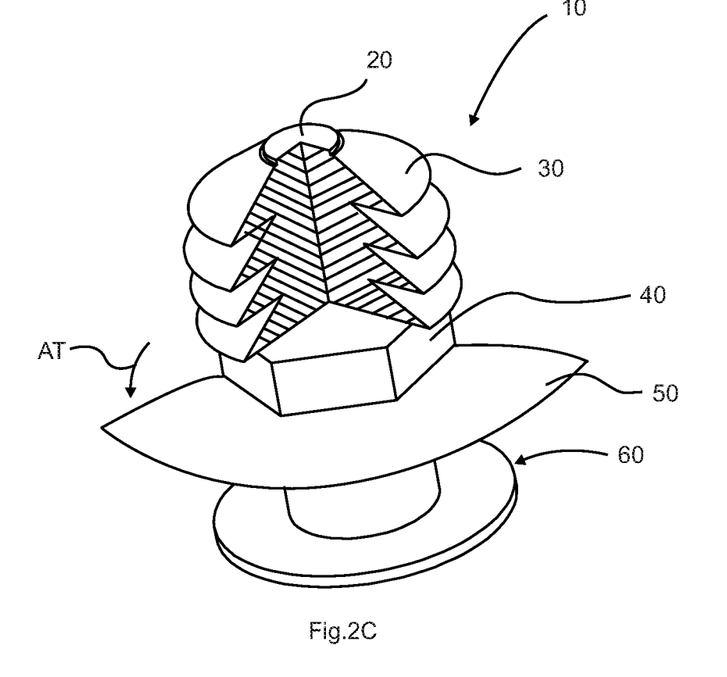
FIG. 2C is a bottom partial cross-sectional perspective view of the exemplary push pin with rotational stopper, show affixed to a panel.
Figure 2D:
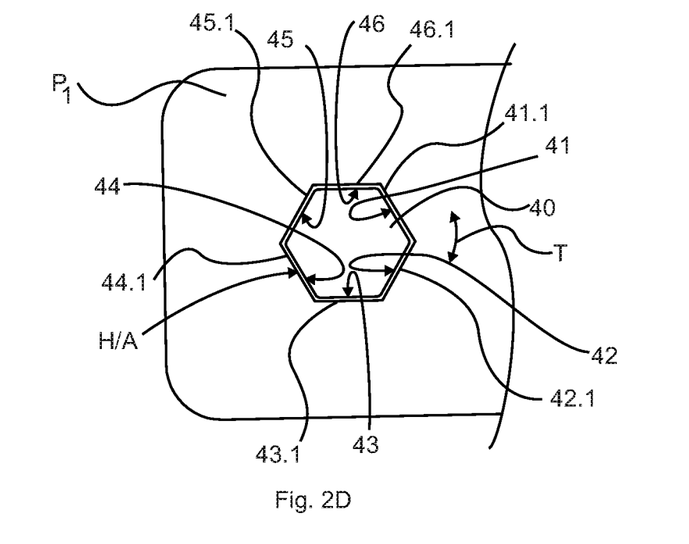
FIG. 2D is a top view of a cross-sectional of the exemplary rotational stopper, show affixed to a panel.

As shown in FIGS. 2C and 2D, both counter insertion force FI via disc spring 50 on one side of panel P and counter removal force FR of retention barbs 30 on the other side of panel P work as opposing forces to retain, maintain or hold three or more sided anti-rotation section 40 therein hole or aperture H/A of panel P.

It is recognized herein that elongated member 20 cross-section and/or retention barbs 30 are not sized to fit hole or aperture H/A of panel P, are not sized to fit the side walls (FIG. 2D) of hole or aperture H/A of panel P, and do not prevent rotation, twisting, or additional vibration of push pin with rotational stopper 10.

Referring again to FIGS. 2C and 2D, three or more sided anti-rotation section 40 may include first anti-rotation side 41, second anti-rotation side 42, third anti-rotation side 43, fourth anti-rotation side 44, fifth anti-rotation side 45, and sixth anti-rotation side 46 mated thereto or closely matched to the configuration of hole or aperture H/A of panel P having side walls, such as first panel side 41.1, second panel side 42.1, third panel side 43.1, fourth panel side 44.1, fifth panel side 45.1, and sixth panel side 46.1. Preferably, this mating thereto or closely matched configurations of first anti-rotation side 41—as first panel side 41.1, second anti-rotation side 42—second panel side 42.1, third anti-rotation side 43—third panel side 43.1, fourth anti-rotation side 44—fourth panel side 44.1, fifth anti-rotation side 45—fifth panel side 45.1, and sixth anti-rotation side 46—sixth panel side 46.1 prevents turning, rotation, or twisting T of push pin with rotational stopper 10 therein hole or aperture H/A of panel P.

It is recognized herein that three or more sided anti-rotation section 40 prevents rotation and twisting due to its snug contact between panel side walls and anti-rotation sides versus retention barbs 30 contact with panel side walls. Moreover, elongated member 20 does not have to be configured or shaped to contact panel side walls to prevent rotation and twisting.

Referring again to FIG. 2D, three or more sided anti-rotation section 40 and hole or aperture H/A of panel P may include a variety of cross-sectional configurations, such as triangle, pentagon, hexagon, heptagon, octagon, nonagon, decagon, and other numbered sides, star, cross, square, rectangle, rhombus, trapezoid, parallelogram, "+" (plus), "H" and other three or more sided multisided shapes configurations.

Figure 2E:
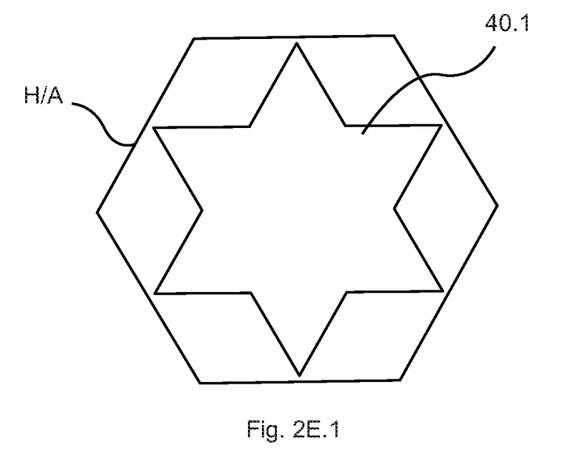
Figure 2E:
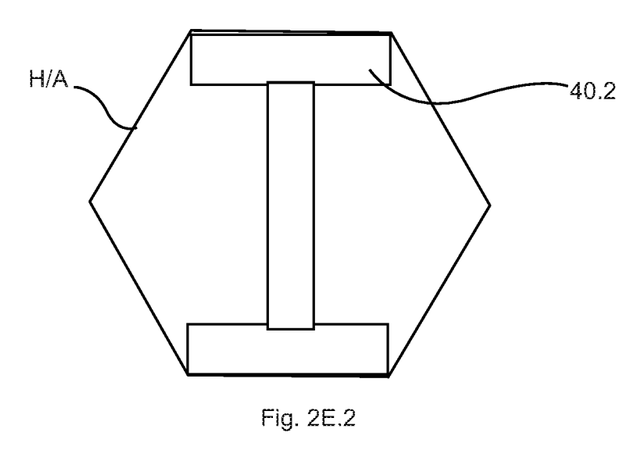
Figure 3A:
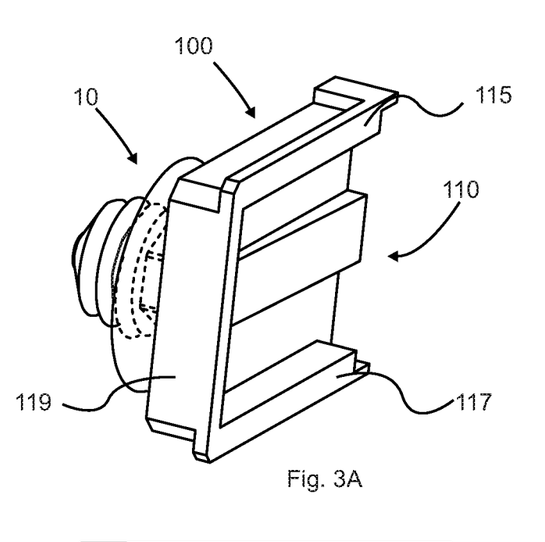
FIG. 3A is a perspective view of the exemplary push pin with rotational stopper, integrated with a USCAR accessory.
Figure 3B:
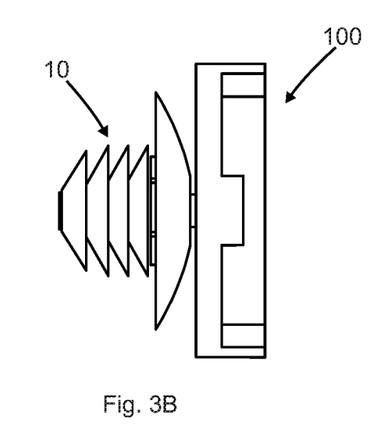
FIG. 3B is an open end side view of the exemplary push pin with rotational stopper, integrated with a USCAR accessory.
Figure 3C:
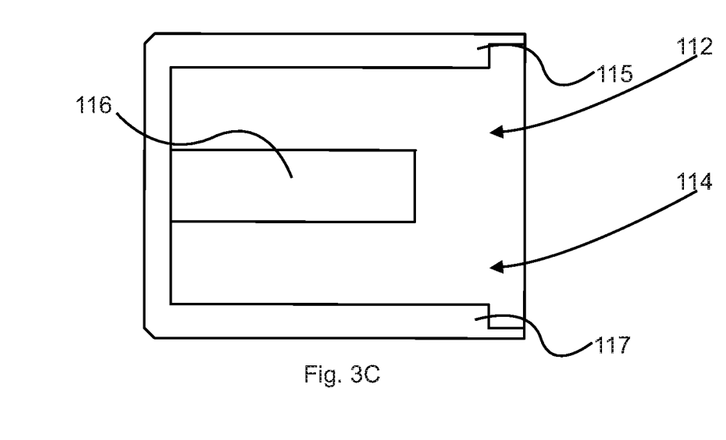
FIG. 3C is a top view of the exemplary push pin with rotational stopper, integrated with a USCAR accessory.
Figure 3D:
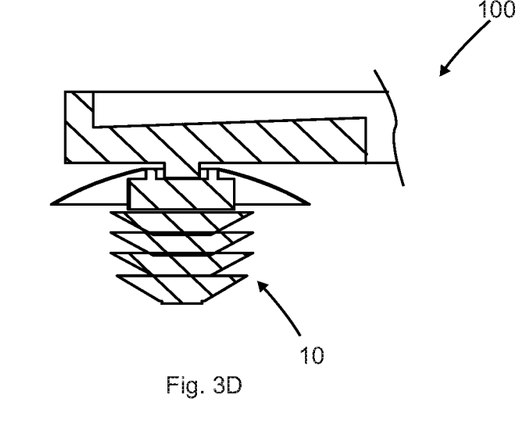
FIG. 3D is an closed end side view of the exemplary push pin with rotational stopper, integrated with a USCAR accessory.
Figures 4A, 4B, 4C, 4D, 4E:
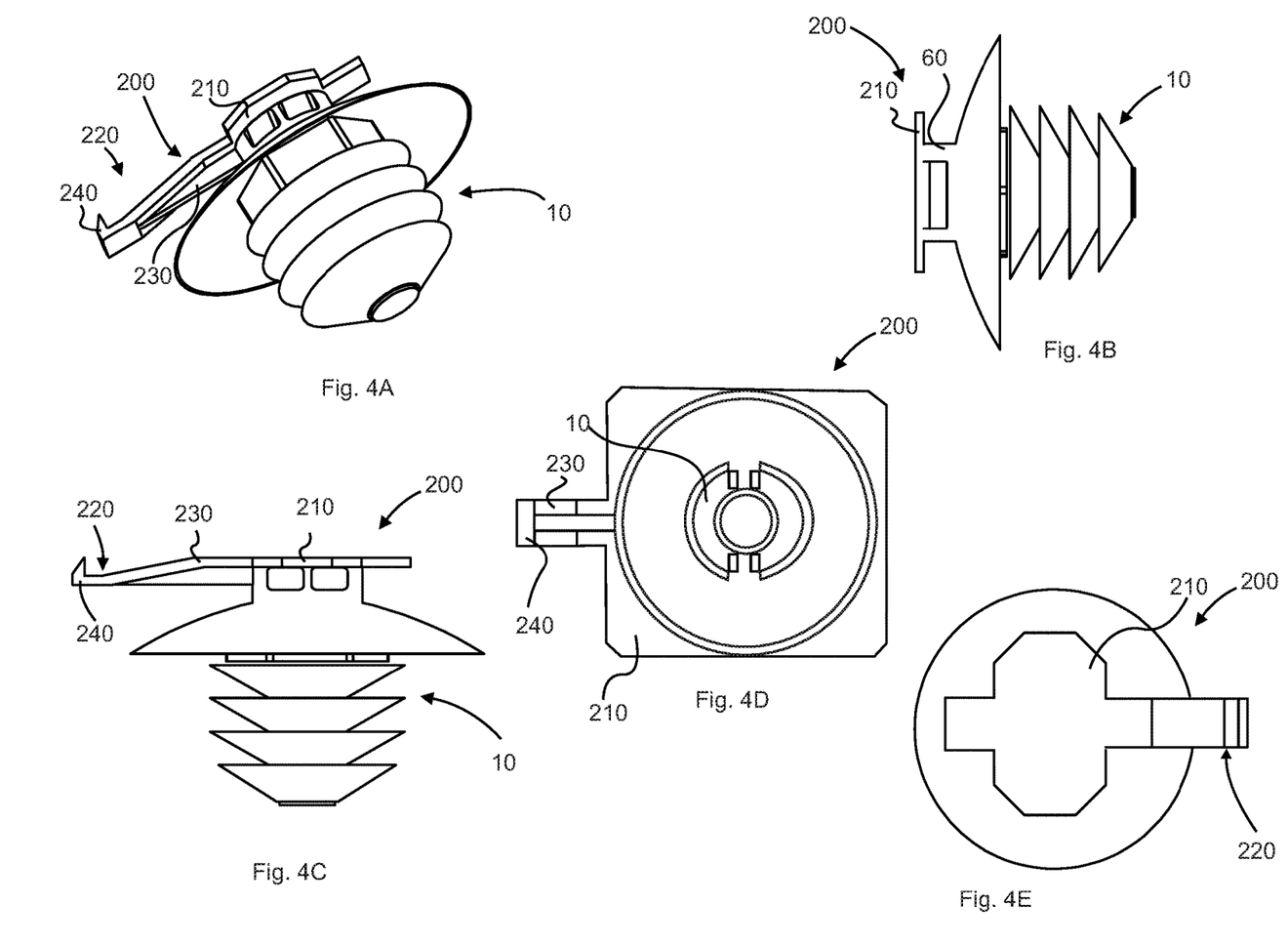
FIG. 4A is a perspective view of the exemplary push pin with rotational stopper, integrated with an alternate USCAP.
FIG. 4B is a side view of the exemplary push pin with rotational stopper, integrated with an alternate USCAR accessory.
FIG. 4C is a another side view of the exemplary push pin with rotational stopper, integrated with an alternate USCAR accessory.
FIG. 4D is a bottom view of the exemplary push pin with rotational stopper, integrated with an alternate USCAR accessory.
FIG. 4E is a top view of the exemplary push pin with rotational stopper, integrated with an alternate USCAR accessory.

Referring again to FIGS. 2E1 and 2E2, by way of example, and not limitation, there is illustrated example embodiments of three or more sided anti-rotation section 40 of push pin with rotational stopper 10. For example in FIG. 2E.1, three or more sided anti-rotation section 40.1 may include multi-sided shapes that have multiple points, such as star shapes with three or more 'points' on the star; shown in FIG. 2E.2 three or more sided anti-rotation section 40.2 may include multi-sided shapes that have multiple flat surface connections with hole or aperture H/A of panel P, such as configurations that look like a plus '+' sign or an 'H' shape; and other three or more sided configurations are contemplated herein to prevent rotation and twisting of push pin with rotational stopper 10 in hole or aperture H/A of panel P.

Referring now to FIGS. 3A, 3B, 3C, and 3D, by way of example, and not limitation, there is illustrated an example embodiment push pin with rotational stopper 10 with a USCAR slot connector 100 formed integral thereto head 60. Three or more sided anti-rotation section 40 may be configured to provide anti-rotation or anti-twisting mount for push pin with rotational stopper 10, to prevent rotation, twisting, add additional vibration of USCAR slot connector 100 relative to panel P. USCAR slot connector 100 is a US car manufactures common, optimized, designs for electrical connectors used to connect two or more wires or bundles to each other. These connectors may be secured to hole or aperture H/A of panel P by connecting the electrical or other connector to the USCAR slot connector 100, which may be connected thereto or formed integral thereto push pin with rotational stopper 10 and may be removeably affixed to hole or aperture H/A of panel P utilizing push pin with rotational stopper 10. It is contemplated herein that twisting, rotation, additional vibration may lead to a malfunction or open circuit of the electrical connector.

USCAR slot connector 100 may be configured as a variety of dimension and sizes having a channel, such as U-channel 110 formed by a plurality of sidewalls or u-channel sidewalls, such as first u-channel sidewall 115, second u-channel sidewall 117, and third u-channel sidewall 119. Moreover, U-channel 110 may be formed as two or more channels, left side channel 114 and right side channel 112 with latch tongue 116 positioned therebetween or therein to clasp, connect, or latch electrical connector to USCAR slot connector 100 and anti-rotationally or anti-twist affix U-channel 110 and electrical connector thereto hole or aperture H/A of panel P utilizing push pin with rotational stopper 10.

It is contemplated herein that other shapes and configurations of USCAR slot connector 100 and other connectors heads may be affixed or formed integral to push pin with rotational stopper 10 whether for automotive, appliance, or other industry sector applications to maintain without rotation or twisting proximate hole or aperture H/A of planar material, frame or panel P.

Referring now to FIGS. 4A, 4B, 4C, 4D, and 4E, by way of example, and not limitation, there is illustrated an example embodiment push pin with rotational stopper 10 with USCAR clip connector 200 formed integral thereto head 60. USCAR clip connector 200 is a US car manufactures common, optimized, designs for electrical connectors used to connect two or more wires or bundles to each other. These connectors may be secured to hole or aperture H/A of panel P by connecting the electrical or other connector to the USCAR clip connector 200, which may be connected thereto or formed integral thereto push pin with rotational stopper 10 and may be removeably affixed to hole or aperture H/A of panel P utilizing push pin with rotational stopper 10.

USCAR clip connector 200 may be configured as a variety of dimension and sizes having a clip, such as latch clip 220 configured having mounting base 210, retention arm 230 with one end of retention arm, a first retention arm end 230 affixed to base 210 and the other end of retention arm, a second retention arm end 230 extending therefrom and configured having retention barb 240 to clasp or latch electrical or other connector to USCAR clip connector 200.

It is contemplated herein that other shapes and configurations of USCAR clip connector 200 and other connectors may be affixed or formed integral to push pin with rotational stopper 10 whether for automotive, appliance, or other industry sector applications to maintain without rotation or twisting proximate hole or aperture H/A of planar material, frame or panel P.

Figure 5A:
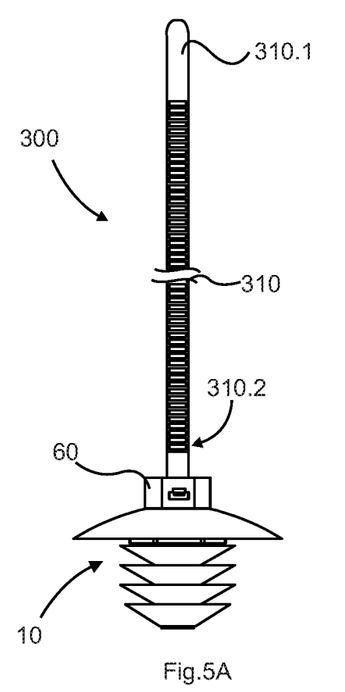
FIG. 5A is a top view of the exemplary push pin with rotational stopper, integrated with a cable tie.
Figure 5B:
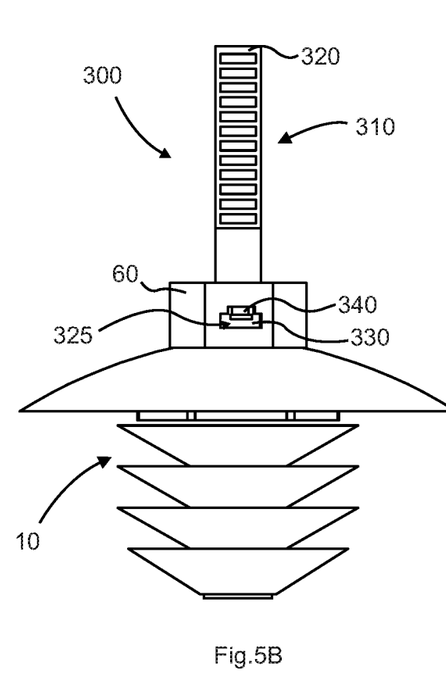
FIG. 5B is a close-up top view of the exemplary push pin with rotational stopper, integrated with a cable tie.
Figure 5C:
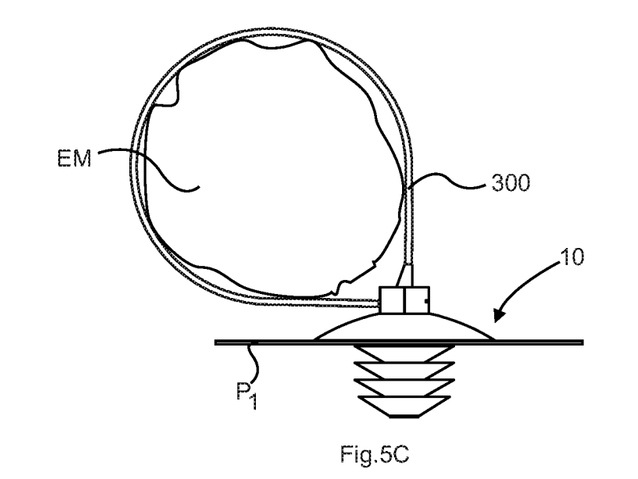
FIG. 5C is a side view of the exemplary push pin with rotational stopper, integrated with a cable tie securing a bundle to a panel.

Referring now to FIGS. 5A, 5B, and 5C, by way of example, and not limitation, there is illustrated an example embodiment push pin with rotational stopper 10 with example embodiment tie or wrap, such as cable tie 300 formed integral thereto head 60. Cable tie 300 may be a standard cable or zip tie having an elongated belt, band or strip, such as strap 310 and a clasp, clip, catch or fastener, such as locking buckle 325.

Preferably strap 310 includes first strap end 310.1 and second strap end 310.2. Strap 310 preferably includes a plurality of teeth, divots, rungs, cut outs, angled notches, recessed teeth, bumps, raised segments, angled riser, angled catch, such as cross-bars 310 formed or positioned on strap 310 from proximately first strap end 310.1 to proximately second strap end 310.2.

Preferably, locking buckle 325 is positioned on one end of strap 310, such as second strap end 310.2 and the other end, such as first strap end 310.1 of strap 310 forms the tail end of strap 310. Locking buckle 325 preferably includes a slot, channel or central passage therethrough, such as channel 330 preferably configured to slidably fit or guide strap 310 therethrough and arranged preferably ninety degrees (90) or proximately perpendicular to strap 310, or proximately parallel to strap 310, or otherwise to enable strap 310 to bend or curl and to feed strap 14 therein channel 330 of locking buckle 325.

Preferably, channel 330 further includes one or more latch, lever, locking tang, such as pawl 340 preferably positioned adjacent channel 330 of locking buckle 325, which preferably engages, confronts, or ratchets over associated ones of cross-bars 320 to lock strap 310 into locking buckle 325 after it is coiled around a bundle of articles or bundled members, such as wires, hydraulic tubing, wiring harness, hose, piece of automotive trim, or other automotive components or the like (elongated members EM) secured and non-rotational or non-twisting via push pin with rotational stopper 10 affixed thereto panel P.

It is contemplated herein that other accessories may be formed thereto or affixed to head including but not limited to a cable tie, wire tie, clamp, double clamp, P-clamp, tape clamp, double tape clamp, cable clamp, hose clamp, cable connector anchor, hinged clip, saddle mount, off-set tape clip, anchor, or other device used to manage or connect cables, and the like.

Figures 6A, 6B:
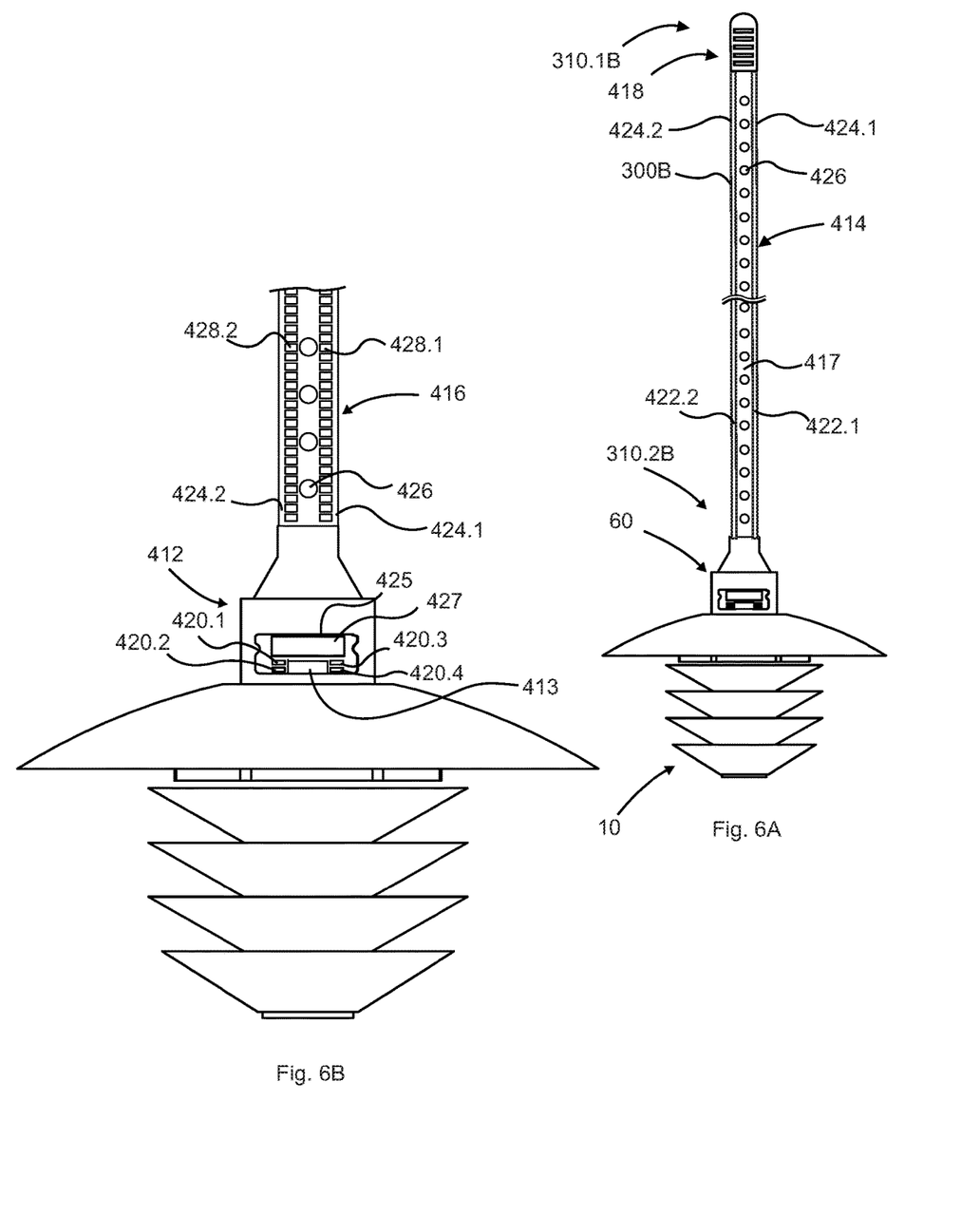
FIG. 6A is a top view of the exemplary push pin with rotational stopper, integrated with an alternate cable tie.
FIG. 6B is a close-up top view of the exemplary push pin with rotational stopper, integrated with an alternate cable tie.

Referring now to FIGS. 6A and 6B, by way of example, and not limitation, there is illustrated an example embodiment push pin with rotational stopper 10 with alternate example embodiment tie or wrap, such as cable tie 400 formed integral thereto head 60. Cable tie 400 may be a an alternate embodiment cable or zip tie having an elongated belt, band or strip, such as strap 310B and a clasp, clip, catch or fastener, such as locking buckle 325B. Preferably, locking buckle 325B is positioned on one end of strap 310B, such as second strap end 310.2B and the other end, such as first strap end 310.1 of strap 310 forms the tail end of strap 310B.

Preferably strap 310B includes first strap end 310.1B and second strap end 310.2B. Strap 310B preferably includes preferably first row 422.1 and second row 422.2 of first cross-bars 428.1 and second cross-bars 428.2 (plurality of cross-bars) of strap 414 preferably engages one or more pawls, such as first pawl 420.1 and second pawl 420.2 of locking buckle 412 as strap 414 is pulled through locking buckle 412 where first pawl 420.1 and second pawl 420.2 ratchet, confront, spring, push, or lift first cross-bars 428.1 and second cross-bars 428.2, respectively, which preferably engages, confronts, or ratchets over associated ones of cross-bars to lock strap 310B into locking buckle 325B after it is coiled around a bundle of articles or bundled members, such as wires, hydraulic tubing, or the like (elongated members EM) secured and non-rotational or non-twisting via push pin with rotational stopper 10 affixed thereto panel P. Moreover, one or more strap aperture 426 may be positioned proximate center line CL or longitudinally spaced between said one or more rails along strap 414, such as approximately centered between one or more cross-bars 428 and/or one or more rails 424.

It is contemplated herein that such functionality set forth above may be configured on all sides of strap 414 to secure strap 414 therein locking buckle 412 as set forth in U.S. Pat. No. 9,021,681 and incorporated herein by reference.

It is contemplated herein that other accessories may be formed thereto or affixed to head including but not limited to a cable tie, wire tie, clamp, double clamp, P-clamp, tape clamp, double tape clamp, cable clamp, hose clamp, cable connector anchor, hinged clip, saddle mount, off-set tape clip, anchor, or other device used to manage or connect cables, and the like.

It is still further contemplated herein that head 60 and cable tie 400 may be an integrated or formed as a unit or part or may be formed separately and assembled together for use.

It is still further contemplated herein that three or more sided anti-rotation section 40 may be configured to provide anti-rotation or anti-twisting mount for push pin with rotational stopper 10, to prevent rotation, twisting, add additional vibration of head cable tie 400 and an additional anchor may be set therein one of strap aperture 426 to further anchor and prevent rotation, twisting, add additional vibration of head cable tie 400 or its contents.

It is still further contemplated herein that push pin with rotational stopper 10, USCAR slot connector 100, USCAR clip connector 200, cable tie 300 and cable tie 400 are preferably formed, molded or configured from a suitable material, such as nylon, polypropylene, polyethylene, polystyrene, polyurethane, neoprene, or alternative resin or thermoplastic, plastic, cardboard, rubber, fiber, fiber reinforced, synthetic rubber, natural rubber, wood, metal, aluminum, alloy, stainless steel, shape memory metal, or any semi-flexible material or the like and any manufacturing method, capable of configuring or providing the structure of push pin with rotational stopper 10, USCAR slot connector 100, USCAR clip connector 200, cable tie 300 and cable tie 400. Preferably, the material includes other suitable characteristics, such as flexibility, strength, rigidity, durability, water-resistance, light weight, pliability, wearability, chemical inertness, oxidation resistance, safety, ease of workability, longevity, or other beneficial characteristic understood by one skilled in the art.

It is contemplated herein that head 60 may be formed in a variety of shapes other than flat and square, such as triangle, square, rectangular, polygon or the like.

Figure 7:
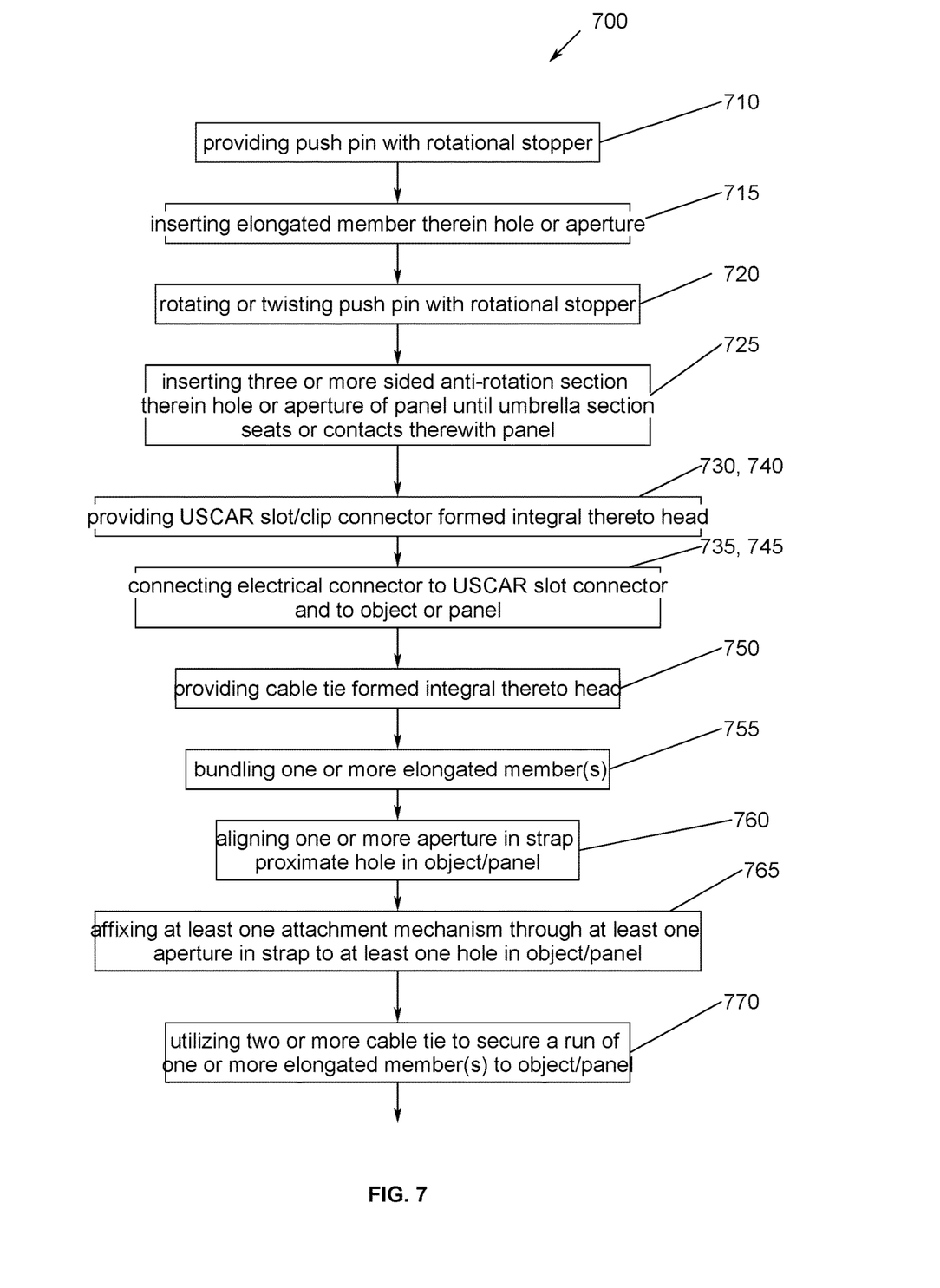
FIG. 7 is a flow diagram of a method of securing an cable tie combination of FIGS. 1-6 and bundle of elongated members to a hole in an object.

Referring now to FIG. 7, there is illustrated a flow diagram 700 a method of securing one or more elongated member(s) EM to object or panel P and/or a method of securing push pin with rotational stopper 10 to hole or aperture H/A of planar material, frame or panel P. In block or step 710, providing push pin with rotational stopper 10 as described above in FIGS. 1-6. In block or step 715, inserting or ratcheting each retention barbs 30 of elongated member 20 of push pin with rotational stopper 10 therein hole or aperture H/A of planar material, frame or panel P. In block or step 720, rotating or twisting push pin with rotational stopper 10 until, for example, first anti-rotation side 41 and first panel side 41.1, second anti-rotation side 42 and second panel side 42.1, third anti-rotation side 43 and third panel side 43.1, fourth anti-rotation side 44 and fourth panel side 44.1, fifth anti-rotation side 45 and fifth panel side 45.1, and sixth anti-rotation side 46 and sixth panel side 46.1 are mated or aligned thereto and enable three or more sided anti-rotation section 40 to insert and lock, anti-rotate therein hole or aperture H/A of panel P. In block or step 725, inserting three or more sided anti-rotation section 40 of push pin with rotational stopper 10 therein hole or aperture H/A of planar material, frame or panel P until disc spring 50 seats or contacts therewith panel P, wherein both counter insertion force FI via disc spring 50 and counter removal force FR of retention barbs 30 work as opposing forces to retain, maintain or hold three or more sided anti-rotation section 40 therein hole or aperture H/A of panel P.

In block or step 730, providing USCAR slot connector 100 formed integral thereto head 60. In block or step 735, connecting anti-rotationally or anti-twist USCAR slot connector 100 and electrical connector thereto hole or aperture H/A of panel P utilizing push pin with rotational stopper 10 to retain, maintain or hold USCAR slot connector 100 therein hole or aperture H/A of panel P.

In block or step 740, providing USCAR clip connector 200 formed integral thereto head 60. In block or step 745, connecting anti-rotationally or anti-twist USCAR clip connector 200 and electrical connector thereto hole or aperture H/A of panel P utilizing push pin with rotational stopper 10 to retain, maintain or hold USCAR clip connector 100 therein hole or aperture H/A of panel P.

In block or step 750, providing cable tie 300/400 as described above in FIGS. 5-6. In block or step 755, first strap end 310.1/310.1B of strap 310/310B is preferably utilized to surround, encircle, cinch, wrap around or bundle one or more cable, rope, channel, hose, wires, or any other linear apparatus or the like, such as elongated member(s) EM. Moreover, strap 310/310B is preferably inserted in locking buckle 325/325B and pulled through channel 330/413 of locking buckle 325/325B, wherein pawl(s) 340/420 of locking buckle 325/325B engages cross-bar(s) 320/428 formed on strap 310/310B to secure elongated member(s) EM together in a bundle, as shown in FIG. 5C.

In block or step 760, aligning, inserting, or ratcheting each retention barbs 30 of elongated member 20 of push pin with rotational stopper 10 therein hole or aperture H/A of planar material, frame or panel P.

In block or step 765, inserting or ratcheting each retention barbs 30 of elongated member 20 of push pin with rotational stopper 10 therein hole or aperture H/A of planar material, frame or panel P with push pin with rotational stopper 10 to retain, maintain or hold cable tie 300/400 therein hole or aperture H/A of panel P.

In block or step 770, utilizing two or more cable ties 300/400 to secure a run of one or more elongated member(s) EM to object or panel P, such as, first cable ties 300/400 may be utilized to secure one section of elongated member(s) EM and one or more other cable ties 300/400 may be utilized to secure one or more other sections of elongated member(s) EM and to support a run or length of elongated member(s) EM to retain, maintain or hold run or length of elongated member(s) EM therein hole or aperture H/A of panel P.

The foregoing description and drawings comprise illustrative embodiments. Having thus described exemplary embodiments, it should be noted by those ordinarily skilled in the art that the disclosures within are exemplary only, and that various other alternatives, adaptations, and modifications may be made within the scope of the present disclosure. Merely listing or numbering the steps of a method in a certain order does not constitute any limitation on the order of the steps of that method. Many modifications and other embodiments will come to mind to one ordinarily skilled in the art to which this disclosure pertains, having the benefit of the teachings presented in the foregoing descriptions and the associated drawings. Although specific terms may be employed herein, they are used in a generic and descriptive sense only and not for purposes of limitation. Moreover, the present disclosure has been described in detail; it should be understood that various changes, substitutions and alterations can be made thereto without departing from the spirit and scope of the disclosure as defined by the appended claims. Accordingly, the present disclosure is not limited to the specific embodiments illustrated herein, but is limited only by the following claims.

The invention claimed is:

1. A push pin for insertion into an aperture in a panel, said push pin comprising:
    an elongated member, said elongated member having a first member end and a second member end, configured with one or more retention barbs extending outward from said elongated member and positioned proximate said first member end;
    a disc spring extending outward from said elongated member opposite said one or more retention barbs, said disc spring positioned proximate said second member end;
    an anti-rotation section integral thereto said elongated member, said anti-rotation section positioned only between said one or more retention barbs and said disc spring, said anti-rotation section configuration is selected from the group consisting of a star, an 'H', a triangle, a pentagon, a hexagon, a heptagon, an octagon, a nonagon, a decagon, a cross, a square, a rectangle, a rhombus, a trapezoid, a parallelogram, and a plus.

2. The push pin of claim 1, wherein said one or more retention barbs configured on an acute angle relative to said elongated member from said second member end to said first member end.

3. The push pin of claim 2, wherein said disc spring configured on an obtuse angle relative to said elongated member from said second member end to said first member end.

4. The push pin of claim 3, wherein said one or more retention barbs provides a counter removal force and said disc spring provides a counter insertion force to hold the push pin therein the aperture in the panel.

5. The push pin of claim 4, wherein said counter removal force opposes said counter insertion force.

6. The push pin of claim 5 further comprises a head positioned proximate and integral thereto said disc spring, wherein said head further comprises a cable tie.

7. The push pin of claim 6, wherein said cable tie further comprises an elongated strap and a locking buckle.

8. The push pin of claim 7, wherein said elongated strap further comprises a plurality of cross-bars and said locking buckle further comprises a channel having a pawl positioned therein, said pawl configured to engage said plurality of cross-bars.

9. The push pin of claim 8, wherein said head further comprises an alternate cable tie having a head with a channel.

10. The push pin of claim 9, wherein said alternate cable tie further comprises an elongated strap having one or more rails configured to run from approximately a first strap end to a second strap end.

11. The push pin of claim 10, wherein said one or more rails and said channel is configured to accommodate passage therethrough of said strap.

12. The cable tie of claim 11, wherein said strap further comprises one or more longitudinally spaced aperture positioned between said one or more rails.

13. The cable tie of claim 12, wherein said one or more rails further comprises one or more cross-bars and said channel further comprises one or more pawls positioned therein to confront individually associated ones of said one or more cross-bars.

14. A method of fastening an electrical component to an aperture in a panel, said method comprising the steps of:
providing a push pin having an elongated member, said elongated member having a first member end and a second member end configured with one or more retention barbs extending outward from said elongated member and positioned proximate said first member end, a disc spring extending outward from said elongated member opposite said one or more retention barbs, said disc spring positioned proximate said second member end; an anti-rotation section integral thereto said elongated member, said anti-rotation section positioned only between said one or more retention barbs and said disc spring, said anti-rotation section configuration is selected from the group consisting of a star, an 'H', a triangle, a pentagon, a hexagon, a heptagon, an octagon, a nonagon, a decagon, a cross, a square, a rectangle, a rhombus, a trapezoid, a parallelogram, and a plus;
inserting said elongated member therein the aperture of the panel;
twisting said push pin to align said anti-rotation section with the aperture of the panel; and
inserting said anti-rotation section therein the aperture of the panel until said disc spring contacts the panel.

15. The method of claim 14, further comprising the step of providing a head positioned proximate and integral thereto said disc spring.

16. The method of claim 15, wherein said head further comprises a cable tie.

17. The method of claim 16, wherein said cable tie further comprises an elongated strap and a locking buckle.

18. The method of claim 17, further comprising the step of coiling said elongated strap around the electrical component.

19. The method of claim 18, further comprising the step of inserting said elongated strap in said locking buckle.

20. The method of claim 19, further comprising the step of cinching said elongated strap therein said locking buckle to affix the electrical component thereto said push pin.

* * * * *